Aug. 12, 1941. H. R. KUENZI 2,252,514
HOIST
Filed Aug. 17, 1939   3 Sheets-Sheet 2
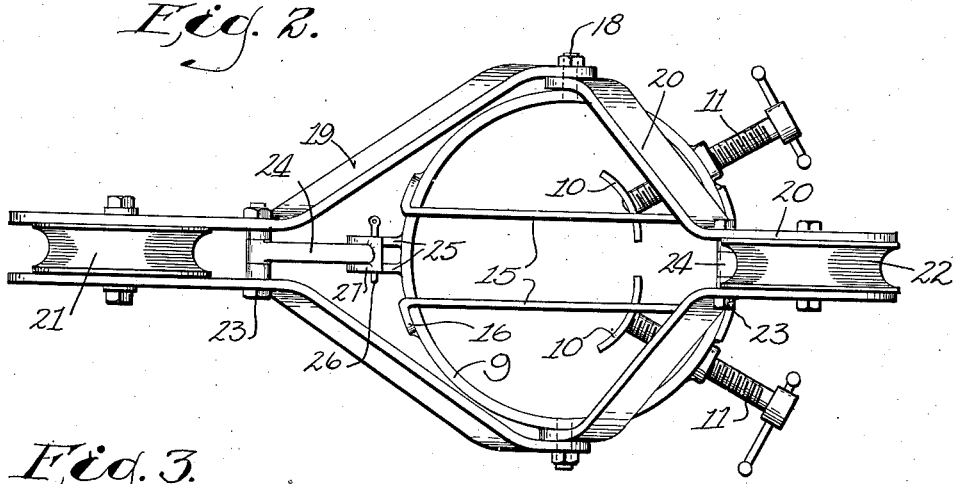
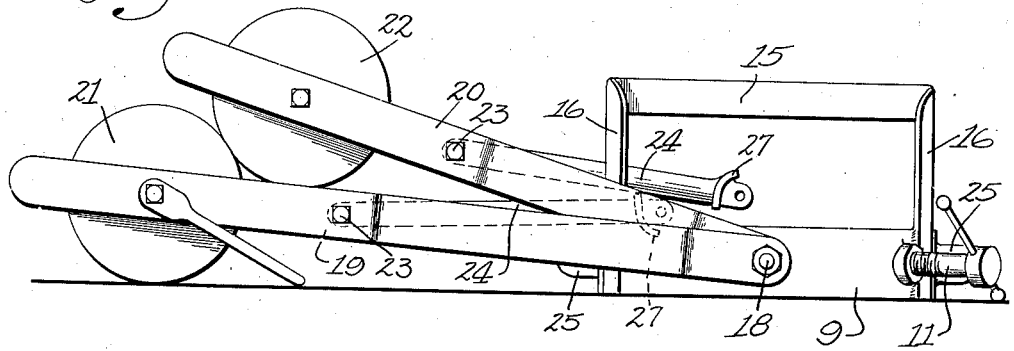
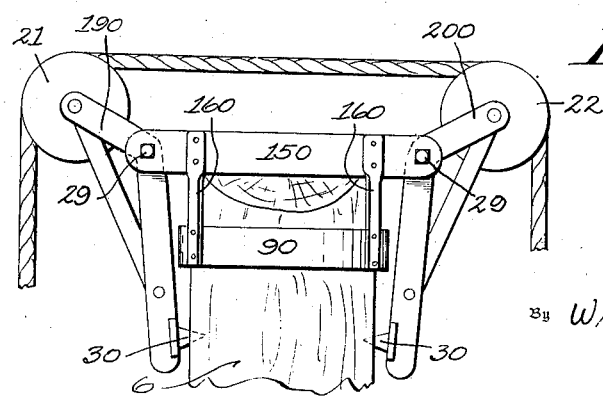
Inventor
Harold R. Kuenzi
By Wheeler, Wheeler and Wheeler
Attorneys Patented Aug. 12, 1941

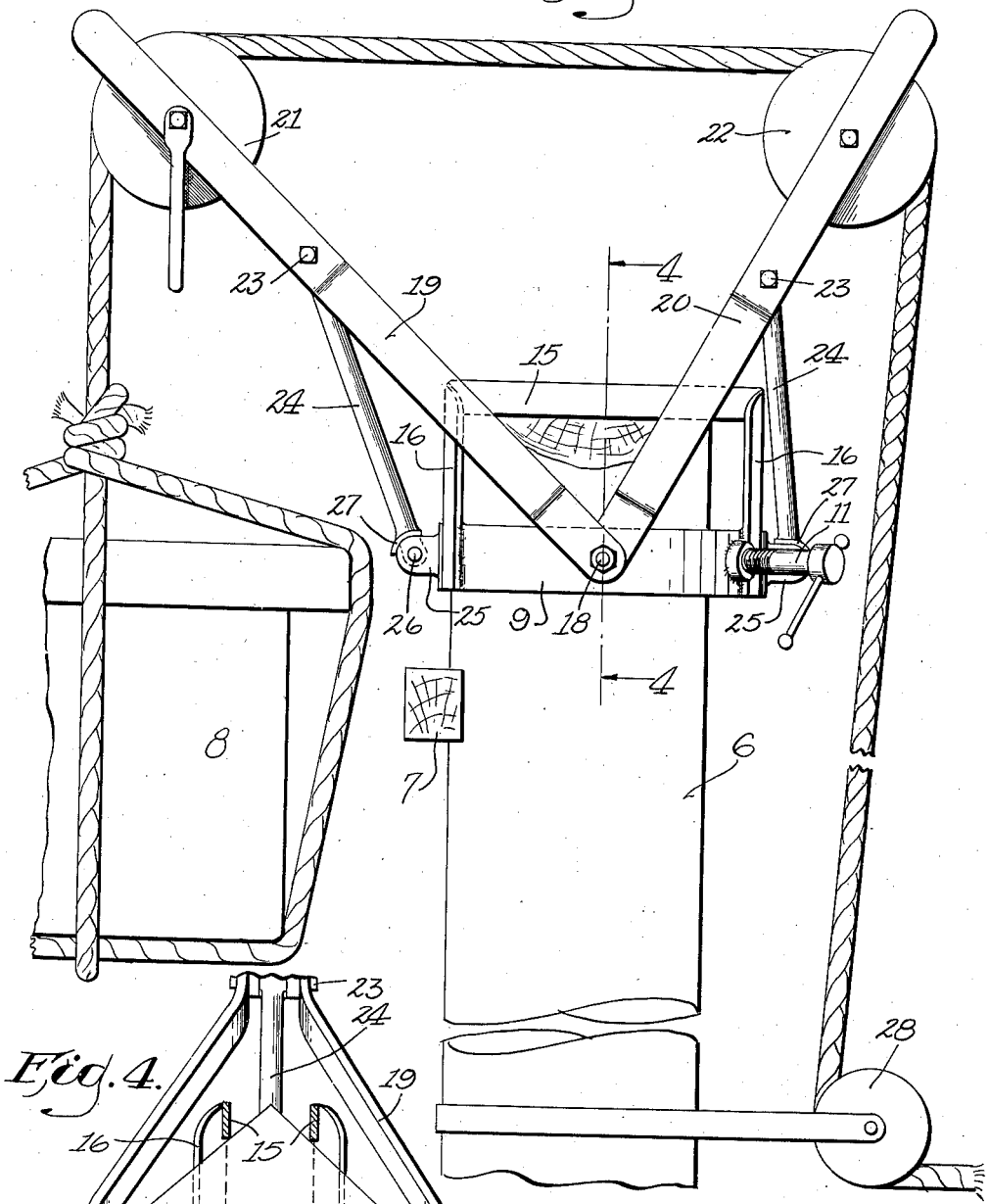

2,252,514

UNITED STATES PATENT OFFICE 2,252,514

HOIST

Harold R. Kuenzi, Horicon, Wis., assignor of one-fourth to B. J. Husting and one-fourth to Robert P. Pike, both of Mayville, Wis.

Application August 17, 1939, Serial No. 290,644

11 Claims. (Cl. 254—139)

This invention relates to improvements in hoists, with particular reference to a hoist applicable to the top of a pole for lifting a transformer.

It is the primary object of the invention to provide a collapsible hoist applicable to the top of a pole and carrying pulleys spaced at opposite sides of the pole and positioned to be disposed above the top of the pole, whereby to permit a transformer or other heavy object to be hoisted into close proximity to the extreme top of the pole, with the load sufficiently balanced upon the top portion of the pole to avoid subjecting that portion of the pole to excessive lateral strains during load transfer.

Other objects of the invention include the provision of a simple and effective structure including foldable arms and braces carrying the pulleys. Other objects will appear from the following disclosure of the invention.

In the drawings:

Figure 1 is a side elevation of the device as it appears in use on a pole.

Figure 2 is a plan view of the device.

Figure 3 is a side elevation of the device as it appears when folded.

Figure 4 is a fragmentary detail view of the device as it appears in section on the line 4—4 of Fig. 1.

Figure 5 is a side elevation showing a modified embodiment of the invention.

Like parts are designated by the same reference characters throughout the several views.

Figure 6:
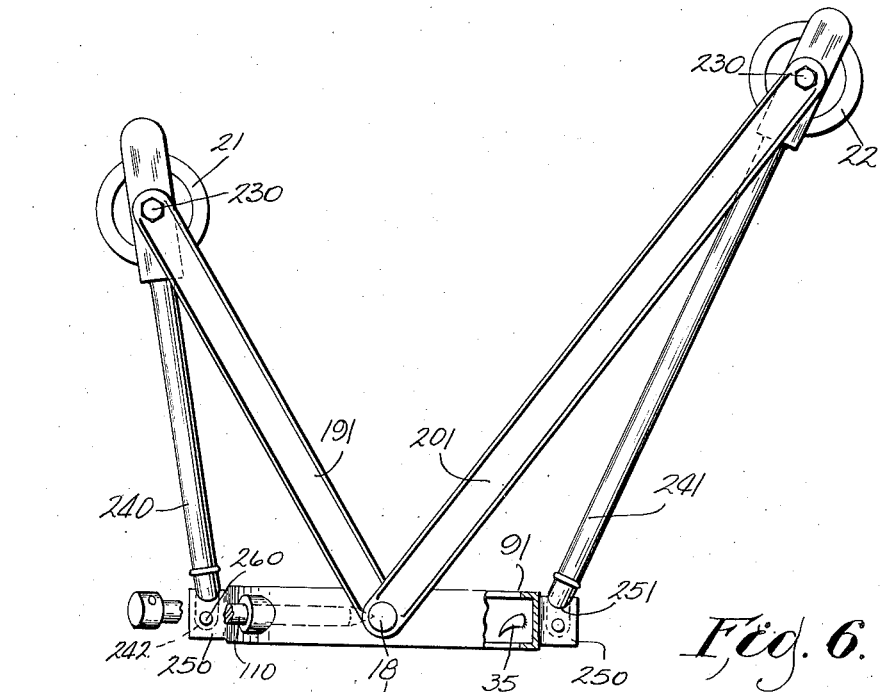
Figure 6 is a view in side elevation of a modified embodiment of my invention, one of the set screws being slightly broken away to expose the structure at the rear thereof.

In order to illustrate the invention I have shown at 6 a conventional pole having a cross arm 7 to which it is desired to attach a transformer 8. It has always been dangerous and difficult to hoist a transformer to a point near the top of a pole and the difficulties and dangers are increased as the proposed location of the transformer approaches the extreme top end of the pole.

In accordance with the present invention, I provide a skeleton cap for the top of the pole which comprises a pole encircling ring 9 sufficiently large to receive any conventional pole and provided at one side with clamping members 10 mounted on screws 11 to be turned up into thrust engagement with the side of the pole to draw the ring tightly thereto.

The ring should be supported from the pole independently of the clamping means just described and accordingly I provide at 15 a pair of straps mutually spaced to pass across the top of the pole in engagement therewith, said straps having integral arms 16 connected with the ring 9 for the support thereof. Thus the operator may simply drop the cap over the top of the pole and it will hang thereon pending manipulation of the clamps.

Pivoted to opposite sides of the ring 9 on bolts 18 are the long and short supports 19 and 20 for the sheaves 21 and 22, respectively. Each support comprises a pair of arms convergent from the pivot bolts 18 to the connecting bolts 23. Upon each connecting bolt 23, I fulcrum a brace 24 having a terminal ear registrable with a clevis 25 carried by the ring portion 9 of the cap. A pin 26 passing through the clevis and the ear at the end of each brace serves to secure the brace detachably to the ring. Each brace preferably has a flange 27 engaging the clevis for the transmission of the thrust of the brace directly to the clevis independently of the pin 26, to relieve the pin of strain.

When the pins are in place the pulley supporting arms will be mutually divergent in an upward direction as shown in Fig. 1, so that the pulley 22 will be carried well at one side of the post and pulley 21 will be carried well at the other side of the post. The distance of the outer periphery of pulley 21 from the post is preferably only slightly in excess of the radius of the transformer to be hoisted so that the transformer will barely clear the cross arm 7. The other pulley 22 should be sufficiently free of the post so that a rope passing thereover will clear the post and everything carried by the post in passing to the sheave 28 at the bottom of the post whence the rope is led to a truck or tractor or windlass which does the actual work of hoisting the transformer.

When the pins 26 are removed, the supports 19 and 20 for the respective pulleys 21 and 22 may be folded down to the level of the cap as shown in Fig. 3. The only purpose in making the support 20 shorter than support 19 is to facilitate this folding adjustment. If so compact a folded article is not necessary, the two supports may be made of uniform length or the length may be varied as desired for other reasons.

In the construction shown in Fig. 5, the ring 90 loosely encircles the post in the manner of ring 9 and the bars 150 extend across the top of the post like bars 15, but project beyond the supporting arms 160 to receive the fulcrum bolts 29 upon which I pivot the supports 190 and 200 for the pulleys 21 and 22. These supports are formed angularly at their fulcrums and may be braced as shown if desired.

Below the fulcrum bolts 29 the arms 190 and 200 are extended downwardly along the post and provided with prongs 30 capable of being embedded in the post under the pressure exerted by the tension of the rope passing over the pulleys 21 and 22. It will be apparent that the downward pull of the rope on the pulleys will tend to oscillate the respective supports 190 and 200 in a direction to embed the prongs 30 in the post, thereby automatically clamping the cap on the top of the post.

Figure 7:
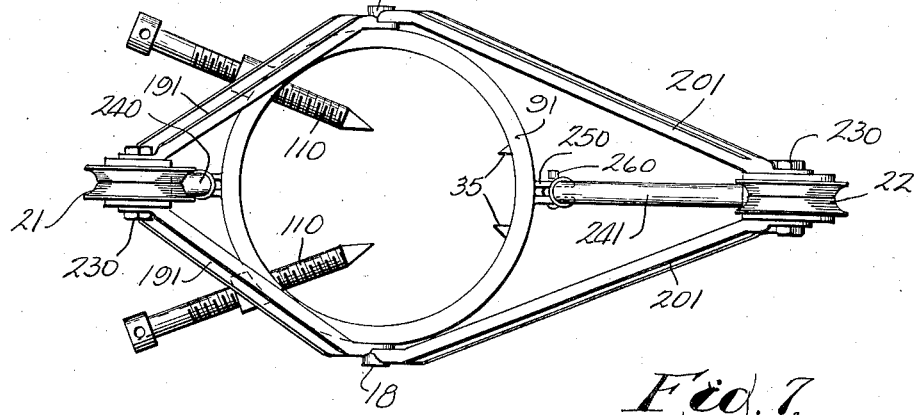
Figure 7 is a plan view of the device shown in Fig. 6.
Figure 8:
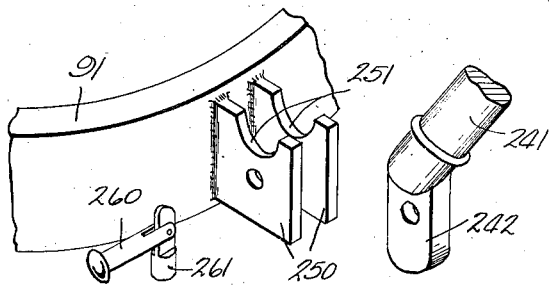
Figure 8 is a fragmentary view showing details of several of the parts as they appear when slightly spaced from each other preliminary to their assembly.

In the construction shown in Figs. 6 to 8 the ring 91 which encircles the top of the post is provided at 35 with post engaging prongs which are preferably downwardly inclined as best shown in Fig. 6. Opposed to these prongs are pointed set screws 110, the arrangement being such that when the set screws are turned up against the post the prongs 35 as well as the points of the set screws will firmly embed themselves in the wood to support the collar 91 at any desired elevation on the post, regardless of the diameter of the post, within the capacity of the collar. The arms 191 and 201 are pivoted on pintle bolts 18 extending through the opposite sides of the collar in the manner described in connection with the construction shown in Fig. 1. The brace rods 240 and 241 are sufficiently large in cross section so that their terminal ends seat on the spaced ears 250 which are notched at 251 to receive the ends of the rods as indicated in Figs. 6 and 8. Beyond each brace rod 240, 241, projects an extension 242 apertured in registry with the apertures of the ears 250 to receive the latch pin 260, the end of which 261 is hinged to retain the latch pin against inadvertent retraction from the registered apertures.

At their upper ends the arm 191 is connected with brace 240, and the arm 201 is connected with brace 241 by the bolts 230 upon which the hoist sheaves 21 and 22 are rotatably mounted. Thus a single bolt serves the purpose of pivotally connecting the respective arms and braces as well as the purpose of rotatably mounting the pulleys.

The device here shown is collapsible in the same manner in which the device shown in Figs. 1, 2 and 3 is collapsible.

The present application is a continuation in part of my application Serial No. 120,009, filed January 11, 1937, allowed August 17, 1938, and which was abandoned after the filing of this application.

I claim:

1. In a device of the character described, the combination with a cap applicable to the top of a post, of a pair of pulley supports pivoted to said cap for movement between operative upwardly extending positions and collapsed positions for transportation, brace means detachably connecting each of said supports with said cap for maintaining the respective supports rigid in their operative positions respecting the cap, and a pin connecting each of said braces releasably with the cap and thrust means engageable between the brace and the cap for sustaining the thrust independently of the pin.

2. In a device of the character described, the combination with a post engaging cap comprising a ring, and means for suspending the ring from the top of a post, a pair of supports pivotally connected with the ring and upwardly divergent therefrom to project higher than the top of the post with which said cap is engaged, means for releasably maintaining said supports in adjustment on said pivotal connections to diverge as aforesaid, and pulleys carried by the supports with their rope engaging surfaces above the level of the cap and at opposite sides thereof.

3. In a device of the character described, the combination with a post engaging cap comprising a ring, and means for suspending the ring from the top of a post, a pair of supports pivotally connected with the ring and upwardly divergent therefrom to project higher than the top of the post with which said cap is engaged, and pulleys carried by the supports with their rope engaging surfaces above the level of the cap and at opposite sides thereof, each of said supports being provided with a brace connected to said ring.

4. In a device of the character described, the combination with a post engaging cap comprising a ring, and means for suspending the ring from the top of a post, a pair of supports pivotally connected with the ring and upwardly divergent therefrom to project higher than the top of the post with which said cap is engaged, and pulleys carried by the supports with their rope engaging surfaces above the level of the cap and at opposite sides thereof, each of said supports being provided with a brace connected to said ring, each brace being detachable from its connection with the ring, and the supports being pivoted to the ring for collapse from their extended positions to positions for transportation.

5. In a device of the character described, the combination with a cap applicable to the top of a post, of a pulley, a support for said pulley pivoted to said cap, and a post clamping means carried by said support and engageable with the post on which the cap is mounted when the pulley is subjected to load, such engagement being determinative of the position of the support and pulley.

6. A device of the character described, comprising the combination with a cap applicable to a post, and including a post encircling portion, of a lever pivoted to said cap and having a part extending beyond the pivot and divergent from the post to comprise a load sustaining member and clamping means at the opposite end of said lever engageable with the side of the post in response to the thrust on the load sustaining member.

7. In a device of the character described, the combination with a cap member applicable across the top of a pole, of a pair of levers pivoted to said cap member intermediate their ends and having above said cap member mutually divergent portions, pulleys mounted on said portions, and pole engaging means carried by the free ends of said levers below said cap members to clampingly engage the pole when said pulleys are subjected to load.

8. In a device of the character described, the combination with an annular frame and means for the support thereof adjacent the top of a post, of a pair of pulleys rotatably disposed above the frame, and collapsible means for the support of said pulleys from the frame comprising arms pivoted to the frame and brace means pivoted to the respective arms at points remote from the frame and releasably connected with the frame beneath said pulleys.

9. In a device of the character described, the combination with an annular frame provided with apertured projections at opposite sides, of brace means having anchorage portions provided with apertures registerable with the apertures of said projections, latch pins extending through the registered apertures of the projections and through the brace means for the releasable connection of the brace means to the frame, a pair of pulley mounting brackets pivoted to opposite sides of said frame intermediate said projections, each bracket comprising a pair of arms extending divergently upwardly from the frame, said brace means being pivotally connected to respective upper portions of the brackets, and a pulley rotatably mounted intermediate each pair of arms in spaced relation to the pivoted bracket portions.

10. A device of the character described, comprising the combination with an annular post engaging frame and means for post engagement carried thereby, of a pair of rigid arms provided with common fulcrum pins at diametrically opposite sides of said frame, braces releasably anchored to said frame intermediate said fulcrum pins and extending upwardly toward said arms, shaft bolts connecting each arm with one of said braces, the braces being bifurcated adjacent said bolts, and a sheave rotatable on each bolt in the bifurcation of each brace.

11. In a device of the character described, the combination of a portable post cap adapted to rest upon the top of a post and provided with means for clamping it to the post below the top, of pairs of pulley supporting arms pivotally secured to opposite sides of the cap, bracing means for supporting the arms of each pair with their upper end portions divergent, pulleys journalled between the opposing arms of the respective pairs, a hoisting cable running over said pulleys, and a pulley supported from the base portion of the pole and about which one end portion of the cable extends, whereby the load may be substantially balanced upon the top of the pole.

HAROLD R. KUENZI.